3,147,187
SUSTAINED RELEASE PHARMACEUTICAL
Malcolm L. Playfair, Portland, Oreg., assignor to Don Hall Laboratories, Portland, Oreg., a corporation of Oregon
No Drawing. Filed Sept. 10, 1962, Ser. No. 222,704
2 Claims. (Cl. 167—82)

This invention pertains to pharmaceuticals, and relates particularly to a composition which affords controlled release of one or more drugs over a predetermined period of time.

This application is a continuation-in-part of my parent application Serial No. 845,077, filed October 8, 1959, and now abandoned.

Whereas sustained release pharmaceuticals have been prepared heretofore by the selective coating of drug particles with slowly soluble materials, it is a principal object of the present invention to provide a drug-containing composition in which all of the components are integrated, by a one step process, into a homogeneous mixture by means of an initial solution or melt.

Another important object of this invention is the provision of a drug-containing composition which may be formulated into compressed tablets or capsules by means of conventional equipment and procedures, to provide a pharmaceutical product of the sustained release type.

The foregoing and other objects and advantages of this invention will appear from the following detailed description.

In its basic concept, the present invention involves the formation, by solution or by melting, of a homogeneous mixture of drug, digestible fat or fat-soluble material, and swelling gum or swelling proteinaceous material. This liquid may be employed per se as a coating composition. Alternatively it may be solidified, by evaporation of the solvent or by cooling of the melt, and processed into tablets or capsules.

The foregoing basic composition may be modified by the inclusion of fats or fat-soluble materials which are resistant to digestion, for purposes of varying the rate of drug release. As explained more fully hereinafter, the proportions of ingredients may be varied over a considerable range to achieve the desired rate of drug release, the proportions being dependent in part upon such variables as the size of granule or tablet, the solubility and nature of the drug, the rate of digestion of the fat or fat-soluble material, the characteristics of the crystalline structure of the composition, and other factors.

The composition of this invention may include drugs of various types for various purposes where sustained release is desirable. In this respect, therefore, the type of drug employed in the composition does not form a part of this invention.

The drug is incorporated in one or more digestible fats or fat-soluble materials, or combinations thereof. These fatty materials function upon digestion in the body to release the drug to the system, and the rate of release is dependent in part upon the rate of digestion of the fatty materials. Examples of digestible fats are stearin, stearic acid, glyceryl mono stearate, diglycol stearate, oleic acid, and others. Examples of digestible fat-soluble materials are glyceryl-mono-oleate, glyceryl-trioleate, magnesium stearate, calcium stearate, and others.

The rate of digestion of the digestible fatty materials may be retarded by the incorporation of varying proportions of those types of fats and fat-soluble materials, or combinations thereof, which are resistant to digestion. Examples of such fats are cetyl alcohol, myristyl alcohol, and others. Examples of such fat-soluble materials are beeswax, carnauba wax, bayberry wax, palm wax, liquid and solid mineral oils, and others.

Also incorporated in the composition of this invention is a swelling agent comprising one or more swelling gums, or swelling proteinaceous materials, or combinations thereof. These materials function, upon digestion of the fatty material, to swell in the presence of body fluids or enzymes, thus causing the composition to disintegrate and to expose more surface area to digestion, thereupon releasing more drug to the system. Examples of swelling gums are such fibrous cellulose derivatives as methyl cellulose, carboxy methyl cellulose, hydroxy ethyl cellulose, and the sodium and other non-toxic metal salts thereof, and other fibrous gums. Examples of proteinaceous materials which are characterized by swelling in the presence of body enzymes are gluten, casein, and others.

A homogeneous mixture of the drug, fatty material and swelling agent may be prepared simply by heating the ingredients to form a melt. Alternatively, for example when the drug is thermolabile, one or more organic solvents may be employed to form a solution of the ingredients. Examples of such organic solvents are dichlorethylene, trichlorethylene, chloroform, carbon tetrachloride, ethyl alcohol, isopropyl alcohol, and others. It also may be found desirable to incorporate organic acids or bases for the purpose of overcoming incompatabilities of ingredients.

In some instances all of the ingredients may be liquified by heating or by solubilization, while in other instances some of the ingredients may remain as a homogeneous suspension of solids in the liquified portion of ingredients. In both instances there is produced a homogeneous mixture of the ingredients.

The foregoing basic composition may be employed in the liquid form as a coating composition. These coatings become solid either upon cooling or evaporation of the volatile solvent at a temperature below the decomposition temperature of the drug component.

The foregoing basic composition also may be employed in the production of compressed tablets or capsules, as desired. In the production of compressed tablets, for example, the solidified composition may be processed by granulation, preforming, etc., in accordance with well known practices. The granules may be compressed to tablet form and sugar coated and colored. Fillers or excipients, such as kaolin, dicalcium phosphate, sugar, starch, and others may be incorporated in the solid mixture as is well kown. Alternatively, the granules may be coated and colored to form granules for encapsulation. As a further alternative, the granules or tablets may be coated with one or more successive layers of the liquified composition containing the same drug or different drug. Each successive layer may be formulated to provide the same or different release rate.

A still further alternative construction is to prepare a plurality of granules of the same drug but having different release rates, or of preparing a plurality of granules of different drugs and having the same or different release rates. These granules may be intermixed in desired proportions and compressed to tablet form, or encapsulated, as desired.

As stated hereinbefore, the proportions of ingredients may be varied over a considerable range to provide the desired release rate of drug. For example, for a given release rate the proportion of fatty material is greater when used with a highly water soluble drug than when used with a relatively insoluble drug, and the proportion of swelling agent is the inverse. The release rate also is dependent upon the crystalline characteristics of the composition, and this is influenced primarily by the type of fatty material. For example, faster release rates are achieved with glyceryl mono stearate, as compared with an equal proportion of stearic acid, because of the more porous structure resulting from the use of the former.

The ultimate size of the granule or tablet also may determine the proportions of ingredients. For example, a tablet of relatively high potency but small size may require a larger proportion of fatty material, including indigestible fatty material, and lesser proportion of swelling agent, than a tablet of larger size. Desired proportions may vary with different release rates, drug solubilities, and other factors.

The following examples are illustrative, the proportions of ingredients being expressed in parts by weight:

EXAMPLE 1

| D-amphetamine hydrochloride | 4 |
| Stearic acid | 8 |
| Magnesium stearate | 4 |
| Cetyl alcohol | 4 |
| Carnauba wax | 4 |
| Dicalcium phosphate | 38 |
| Methyl cellulose | 38 |

The above ingredients were mixed together and heated at about 205° F. to obtain a homogeneous melt, after which it was cooled and granulated by conventional procedure. Tablets were prepared of this granulation, and coated by conventional procedure. Alternatively, the granules were coated and encapsulated. Still further, the granules were melted or dissolved in appropriate solvents and employed as a coating for tablets containing other drugs.

To illustrate the effectiveness of the composition of Example I, it was tableted on ⅜″ standard punches and the tablets were tested for drug release pattern in accordance with the Modified U.S.P. Plunging Basket Method described in Drug Standards, volume 27, No. 4, July-August 1959. Comparative tests also were made on tablets in which the cellulose gum was replaced by varying percentages of corn starch. In these instances the parts by weight of active drug remained constant and the balance of the excipients were adjusted to total 100%. The results of these tests are set forth in the following table, in which the percentages of drug release represent the accumulated total drug released at the indicated time.

Table I

| At end of— | Example I | 10% corn-starch | 38% corn-starch | 50% cornstarch |
|---|---|---|---|---|
| 1st hour | 25.9 | 16.5 | 45.1 | 100.0 in less than 15 minutes. |
| 2nd hour | 45.3 | 21.4 | 51.3 | |
| 3rd hour | 57.1 | 24.3 | 81.0 | |
| 4th hour | 67.3 | 26.1 | 100.0 | |
| 6th hour | 86.0 | 32.7 | | |
| 8th hour | 100.0 | 35.4 | | |

The composition using 10 percent corn starch had to be hand fed to the tablet die, and was tableted with considerable difficulty since it tended to extrude and stick. Moreover, drug release rate varied unpredictably with different samples by as much as plus or minus 50% from the average rate tabulated above, as compared with maximum variation of 15 percent in the samples of Example I.

EXAMPLE II

| D-amphetamine hydrochloride | 10 |
| Glyceryl-mono-stearate | 21 |
| Glyceryl-di-stearate | 34 |
| Magnesium stearate | 8 |
| Carnauba wax | 5 |
| Methyl cellulose | 22 |

The composition of Example II was prepared in the same manner as the composition of Example I, and utilized in the preparation of tablets and capsules.

The effectiveness of the composition of Example II and its comparison with starch substitutions for the cellulose gum, as in Example I, are illustrated by the following test data:

Table II

| At end of— | Example II | 10% corn-starch | 22% corn-starch | 50% cornstarch |
|---|---|---|---|---|
| 1st hour | 23.0 | 20.0 | 22.1 | 100.0 in less than one hour. |
| 2nd hour | 35.6 | 23.7 | 27.8 | |
| 3rd hour | 59.7 | 30.0 | 35.5 | |
| 4th hour | 79.4 | 34.1 | 42.6 | |
| 6th hour | 91.6 | 43.9 | 45.9 | |
| 8th hour | 100.0 | 51.1 | 63.0 | |

The problems of tableting and the unpredictability of drug release rate of different samples, as discussed in connection with Example I, also obtained with the above samples using 10% corn starch. The samples using 22% corn starch were somewhat less difficult to tablet, although still sufficiently difficult to render the manufacture economically unfeasible. Even with the highest degree of process control the drug release rate varied with different samples by more than plus or minus 25 percent.

EXAMPLE III

| Amobarbital | 50 |
| Stearic acid | 27 |
| Sodium carboxymethyl cellulose | 23 |

The composition of Example III was prepared in the same manner as Examples I and II, and utilized in the production of tablets and capsules. Alternatively, tablets of Example II were coated with the melt of Example III to provide a composite tablet in which amobarbital is first released to the system over a period of time, after which the amphetamine is released for a further extended period of time.

The following test data illustrate the effectiveness of the composition of Example III in comparison with starch substitutions, as in the preceding examples:

Table III

| At end of— | Example III | 10% corn-starch | 23% corn-starch | 50% cornstarch |
|---|---|---|---|---|
| 1st hour | 26.3 | 37.6 | 41.7 | 100.0 in less than 15 minutes. |
| 2nd hour | 44.2 | 74.3 | 98.7 | |
| 3rd hour | 51.6 | 100.0 | 100.0 | |
| 4th hour | 68.4 | | | |
| 6th hour | 89.5 | | | |
| 8th hour | 100.0 | | | |

The same difficulties of tableting and unpredictability of drug release rate of different samples of the starch substituted compositions were experienced in this example as in the previous examples.

Moreover, it is to be observed by comparing the results of the three examples, that the drug release rate for the compositions containing 10 percent starch varied from as low as 20 percent in eight hours in Example I to 100 percent in three hours in Example III. The composition of Example II containing 22 percent starch exhibited as low as 47 percent drug release in eight hours, while the composition of Example III containing 23 percent starch effected 100 percent release in three hours. Thus, it is evident that starch is not a satisfactory substitute for cellulose gums in the compositions of the present invention.

From the foregoing it is believed to be apparent that the present invention provides a composition which may incorporate any desired drug or combinations of drugs and which may be employed effectively in the production of tablets and capsules which are characterized by yielding a sustained and accurately controlled release of the drug component over predetermined periods of time. The composition further enables this production to be carried out in conventional equipment and according to conventional procedures.

It will be apparent to those skilled in the art that various changes in the types and proportions of ingredients exemplified hereinbefore may be made without departing from the spirit of this invention and the scope of the appended claims.

Having now described my invention and the manner in which the same may be used, what I claim as new and desire to secure by Letters Patent is:

1. A sustained release pharmaceutical composition consisting essentially of a homogeneous mixture of drug, digestible fatty material selected from the class consisting of fats and fat-soluble substances that are digestible by the human body, and swelling agent selected from the class consisting of those cellulose ethers and proteinaceous substances that are characterized by swelling in the presence of a substance selected from the group consisting of body fluids and enzymes.

2. The composition of claim 1 including fatty material selected from the class consisting of fats and fat-soluble substances which are resistant to digestion by the human body.

References Cited in the file of this patent

UNITED STATES PATENTS

| | | |
|---|---|---|
| 2,793,979 | Svedres et al. | May 28, 1957 |
| 2,805,977 | Robinson et al. | Sept. 10, 1957 |
| 2,853,420 | Lowey | Sept. 23, 1958 |
| 2,875,130 | Grass et al. | Feb. 24, 1959 |
| 2,879,268 | Jullander | Mar. 24, 1959 |
| 2,883,327 | Dale | Apr. 21, 1959 |
| 2,887,438 | Cooper | May 19, 1959 |
| 2,887,440 | Greminger et al. | May 19, 1959 |
| 2,895,881 | Hamada | July 21, 1959 |
| 2,951,792 | Swintosky | Sept. 6, 1960 |
| 2,980,589 | de Grunigen | Apr. 18, 1961 |

FOREIGN PATENTS

| | | |
|---|---|---|
| 109,438 | Australia | Jan. 11, 1940 |
| 669,782 | Great Britain | Apr. 9, 1952 |

OTHER REFERENCES

Drug & Cosmetic Ind., September 1948, p. 296.